(12) United States Patent
Cho et al.

(10) Patent No.: US 9,979,808 B2
(45) Date of Patent: May 22, 2018

(54) MOBILE TERMINAL AND CONTROLLING METHOD THEREOF

(71) Applicant: LG ELECTRONICS INC., Seoul (KR)

(72) Inventors: Taehoon Cho, Seoul (KR); Jie Seol, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 9 days.

(21) Appl. No.: 14/995,959

(22) Filed: Jan. 14, 2016

(65) Prior Publication Data

US 2016/0373569 A1    Dec. 22, 2016

(30) Foreign Application Priority Data

Jun. 17, 2015   (KR) .................. 10-2015-0085733

(51) Int. Cl.
*H04M 1/00* (2006.01)
*H04M 1/725* (2006.01)
*H04W 4/00* (2018.01)
*H04W 4/02* (2018.01)

(52) U.S. Cl.
CPC ..... *H04M 1/72522* (2013.01); *H04M 1/7253* (2013.01); *H04M 1/72563* (2013.01); *H04M 1/72569* (2013.01); *H04M 1/72597* (2013.01); *H04W 4/008* (2013.01); *H04W 4/02* (2013.01); *H04M 1/72552* (2013.01); *H04M 1/72572* (2013.01); *H04M 2250/04* (2013.01); *H04M 2250/52* (2013.01)

(58) Field of Classification Search
CPC ............................................. H04M 1/72522

USPC ........................................................ 455/566
See application file for complete search history.

(56) References Cited

U.S. PATENT DOCUMENTS

| | | | |
|---|---|---|---|
| 2004/0002305 | A1 | 1/2004 | Byman-Kivivuori et al. |
| 2005/0136886 | A1 | 6/2005 | Aarnio et al. |
| 2008/0056454 | A1* | 3/2008 | Lahtiranta ............. H04M 1/642 379/67.1 |
| 2009/0005072 | A1 | 1/2009 | Forstall et al. |
| 2011/0007962 | A1* | 1/2011 | Johnson ............ G06F 17/30781 382/154 |
| 2011/0010674 | A1* | 1/2011 | Knize ..................... G01C 21/20 715/849 |
| 2011/0035284 | A1* | 2/2011 | Moshfeghi ............. G06Q 30/02 705/14.58 |
| 2012/0258735 | A1* | 10/2012 | Monteverde .......... H04W 4/021 455/456.3 |
| 2013/0124508 | A1* | 5/2013 | Paris ................... G06F 17/3028 707/723 |

(Continued)

OTHER PUBLICATIONS

European Patent Office Application No. 16000037.8, Search Report dated Nov. 17, 2016, 7 pages.

*Primary Examiner* — Charles Shedrick
(74) *Attorney, Agent, or Firm* — Lee, Hong, Degerman, Kang & Waimey PC

(57) ABSTRACT

A mobile terminal and controlling method thereof is provided via which a user's state can be reflected in various activities performed in the mobile terminal by utilizing the set indicator information. The mobile terminal includes a controller to set an indicator indicating a user's environment and a display unit to display information on the set indicator in response to a control command of the controller.

18 Claims, 31 Drawing Sheets

(56) References Cited

U.S. PATENT DOCUMENTS

2013/0246419 A1* 9/2013 Kwak ............... G06F 17/30029
                                                    707/736
2014/0086194 A1* 3/2014 Sugahara .............. H04W 28/16
                                                    370/329
2014/0173439 A1   6/2014 Gutierrez et al.

* cited by examiner

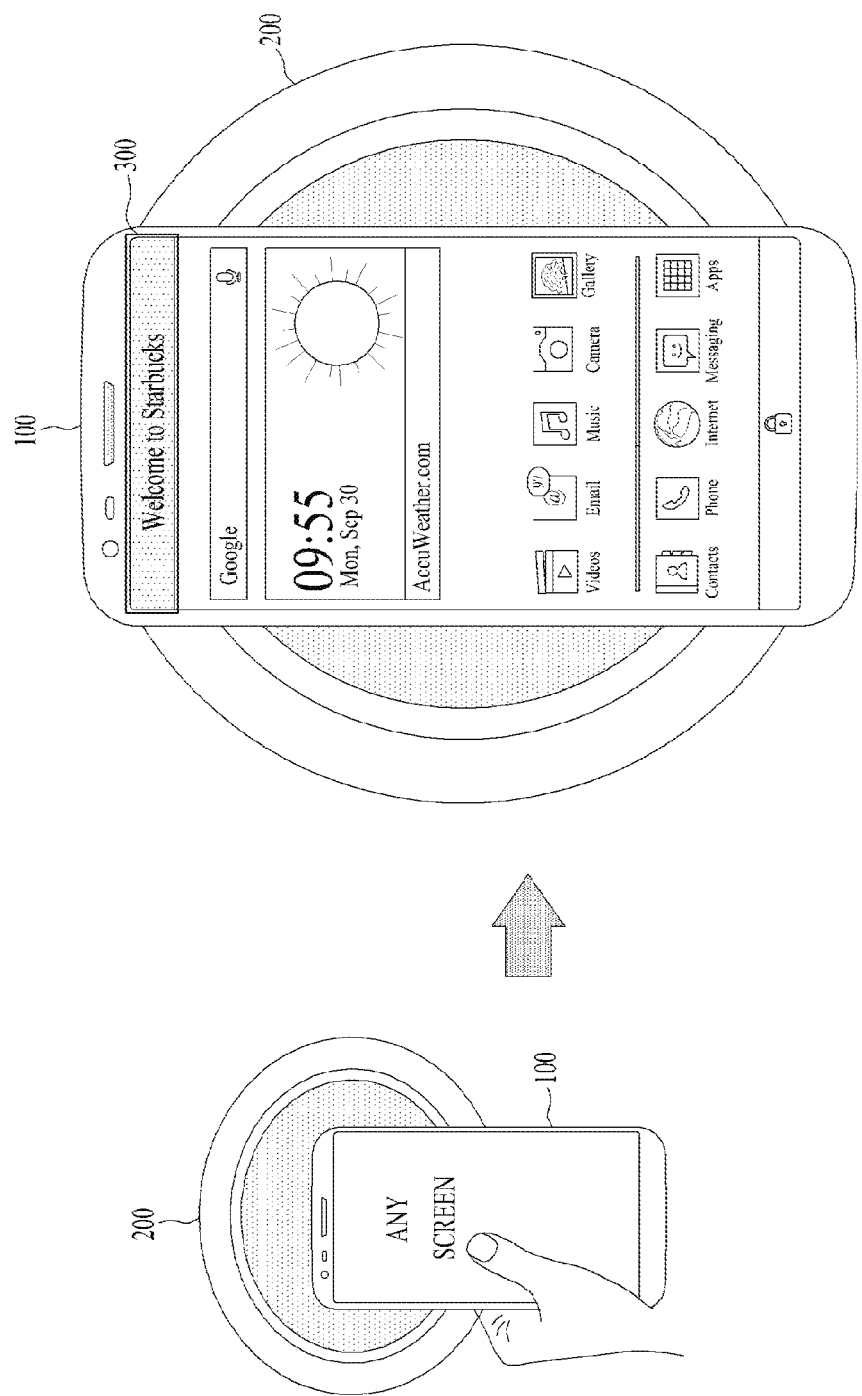

recipient

Recipient

FIG. 19C
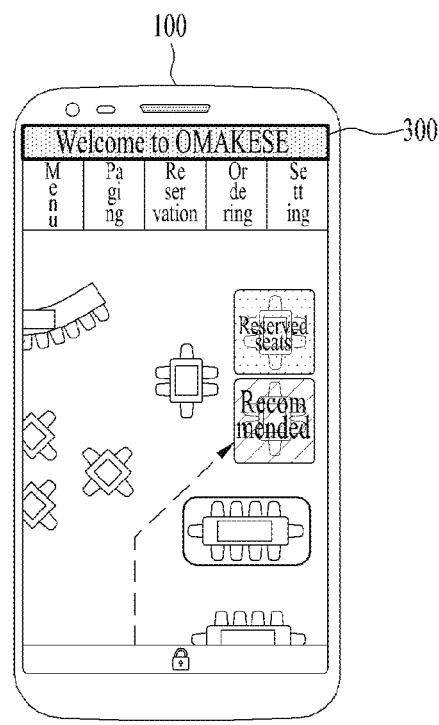
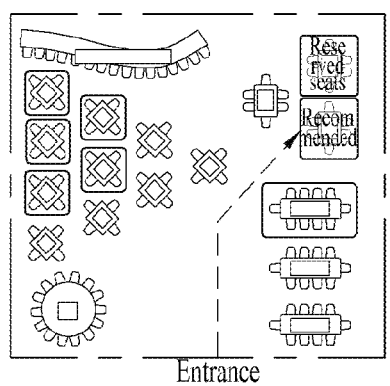

MOBILE TERMINAL AND CONTROLLING METHOD THEREOF

Pursuant to 35 U.S.C. § 119(a), this application claims the benefit of earlier filing date and right of priority to Korean Application No. 10-2015-0085733, filed on Jun. 17, 2015, the contents of which are hereby incorporated by reference herein in their entirety.

FIELD OF THE INVENTION

The present invention relates to a mobile terminal, and more particularly, to a mobile terminal for setting an indicator indicating a user's state and controlling method thereof. Although the present invention is suitable for a wide scope of applications, it is particularly suitable for reflecting the user's state in various activities performed in the mobile terminal by utilizing the set indicator information.

DISCUSSION OF THE RELATED ART

Generally, terminals can be classified into mobile/portable terminals and stationary terminals. In particular, the mobile terminals can be further classified into handheld terminals and vehicle mounted terminals according to possibility of user's direct portability.

Recently, functions of a mobile terminal tend to be diversified. For instance, the diversified functions include a function of data and audio communication, a function of photographing and video-making through a camera, a function of audio recording, a function of music file play through a speaker system, a function of outputting an image or video to a display unit, and the like. A prescribed terminal is further equipped with an electronic game play function or performs a multimedia player function. Particularly, a recent mobile terminal is able to receive multicast signals for providing visual contents such as a broadcast, a video, a television program and the like.

As functions of the terminal are getting diversified, the terminal tends to be implemented as a multimedia player provided with complex functions such as photographing of photos or videos, playback of music or video files, game play, broadcast reception and the like for example.

Meanwhile, a user may desire to represent various environments and his situation. Particularly, if a user's state is not a temporary state but a state lasting for a predetermined time, while a terminal is used, the user may desire to reflect the user's state in various activities performed in the mobile terminal by utilizing information indicating his state while using the terminal. To support and increase the user's request and the terminal functions, it may be able to consider the improvement of structural parts and/or software parts of the terminal.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which a user's state can be reflected in various activities performed in the mobile terminal by utilizing an indicator information indicating the user's state.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention may include a controller configured to set an indicator indicating a user's environment and a display unit configured to display information on the set indicator in response to a control command of the controller.

Preferably, the mobile terminal may further include a short range communication module configured to transceive data with a tag terminal and the controller may set the indicator using the data received from the tag terminal.

Preferably, the controller may set the indicator through a user's input.

Preferably, the controller may modify a name of the indicator by a user's input.

Preferably, the controller may control the indicator information to be transmitted to a different mobile terminal.

More preferably, the controller may control a different user currently sharing the indicator information to be displayed on the display unit in response to a user's input.

Preferably, when the controller launches an application installed on the mobile terminal, the controller may use the information on the indicator.

More preferably, when the controller sends a message, the controller may send the information on the indicator in a manner of adding the information on the indicator to the message. The controller may add location information of the user in the information on the indicator. When the indicator information added message is received, the controller may display the indicator information on the display unit together with the message. When the indicator information added message is received, the controller may launch an application related to the information contained in the indicator. If the indicator information added to the message comprises location information of a message sender, the controller may control the user to be guided to a location of the message sender by launching a navigation application for introducing a route.

More preferably, when a phone call is made, the controller may send the information on the indicator in addition.

More preferably, while the indicator information is shared with at least one person, when the user uses an application for sending and receiving phone calls, the controller may preferentially display a contact of a sharer of the indicator information on the display unit.

More preferably, when an incoming call declining message list is displayed on the display unit, the controller may further display a declining message corresponding to the user's environment using the indicator information.

More preferably, the controller may add the information on the set indicator to a captured photo.

More preferably, the controller may control the data to be transceived with the tag terminal as well as the indicator information. The controller may control menu information received from the tag terminal to be displayed on the display unit. The controller may control information on an item selected from the menu to be sent to the tag terminal. And, the controller may add information related to a captured photo in the data received from the tag terminal to the captured photo.

Accordingly, embodiments of the present invention provide various effects and/or features.

According to at least one embodiment of the present invention, an indicator information indicating a user's state can be set. By utilizing the indicator information, the user's state can be reflected in various activities performed in the mobile terminal.

Effects obtainable from the present invention may be non-limited by the above mentioned effect. And, other unmentioned effects can be clearly understood from the following description by those having ordinary skill in the technical field to which the present invention pertains. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 2 is a diagram for one example of setting an indicator by tagging a mobile terminal to a tag terminal;

FIG. 19A, FIG. 19B and FIG. 19C are diagrams for one example of a restaurant seat disposition using a tag terminal installed at a restaurant;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several disclosed components, functions or steps, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
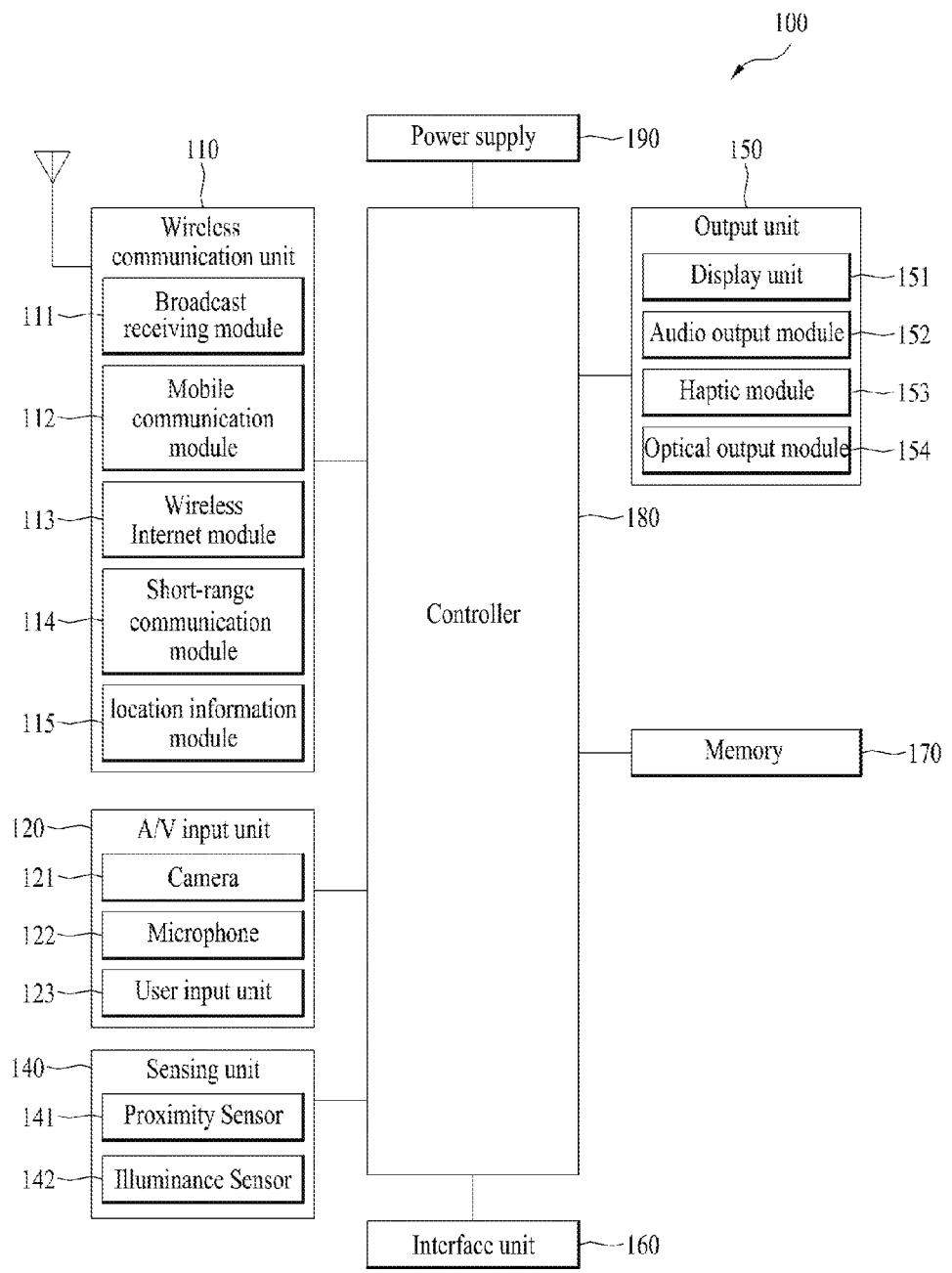
FIG. 1A is a diagram to describe a mobile terminal device related to the present invention.
Figure 1B:
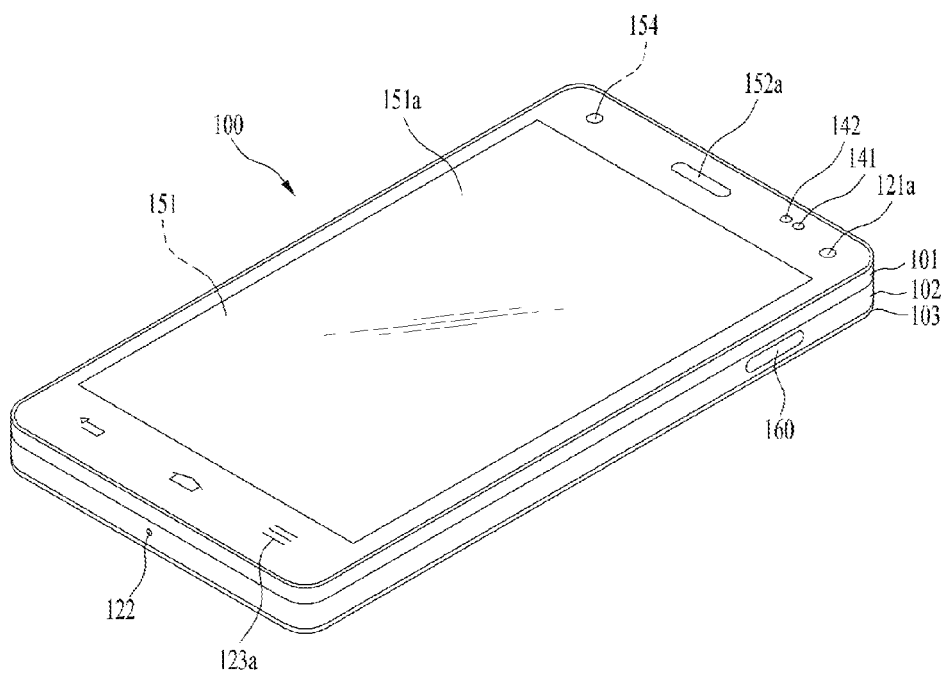
FIG. 1B and FIG. 1C are diagrams for the concept of one example of a mobile terminal device related to the present invention in different views, respectively.
Figure 1C:
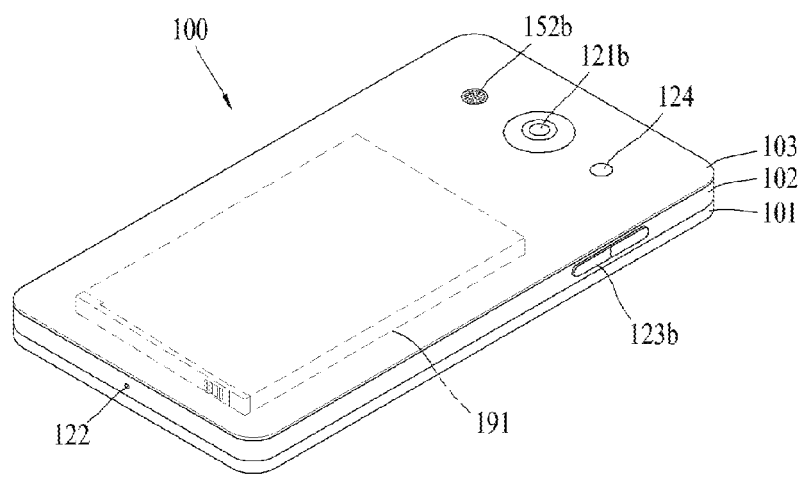

Reference is now made to FIGS. 1A-1C, where FIG. 1A is a block diagram of a mobile terminal in accordance with the present invention, and FIGS. 1B and 1C are conceptual views of one example of the mobile terminal, viewed from different directions.

The mobile terminal 100 is shown having components such as a wireless communication unit 110, an AV input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the AV input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can process or provide appropriate information or function to a user by processing signals, data, information and the like inputted or outputted through the above-mentioned components or running application programs saved in the memory 170.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the above-mentioned components can cooperatively operate to embody operations, controls or controlling methods of the mobile terminal according to various embodiments mentioned in the following description. And, the operations, controls or controlling methods of the mobile terminal can be embodied on the mobile terminal by running at least one or more application programs saved in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee™, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The AV input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102 and rear cover 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the first audio output module 152a, the second audio output module 152b, the proximity sensor 141, the illumination sensor 142, the light output unit 154, the first camera 121a, the second camera 121b, the first manipulating unit 123a, the second manipulating unit 123b, the microphone 122, the interface unit 160, and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth™ port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121b may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee™, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e.g., a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth™ connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

The mobile terminal 100 according to the present specification can set up an indicator indicating a user's environment.

In this case, the indicator may mean a setting state of the mobile terminal to indicate a user located space, a user's current status, a user's emotional state, a colleague accompanied by a user, and/or the like. For instance, assume that a user enters a restaurant. In doing so, when 'dining at the restaurant' is set up on the mobile terminal 100, an indicator for setting a user's state is set. For another instance, assume that a user is watching a movie. In doing so, the user can set up a status that the user himself is watching the movie as well as set a so-called 'manner mode' for muting sound from the mobile terminal 100. In this case, 'setting the status of watching the movie' corresponds to the indicator setting in the present specification. The meaning of the indicator shall be further understood in detail through the description of the mobile terminal 100 according to the present specification.

According to one embodiment of the present specification, the indicator setting is possible through an action of tagging the mobile terminal to a tag terminal.

FIG. 2 is a diagram for one example of setting an indicator by tagging a mobile terminal to a tag terminal.

Referring to FIG. 2, it can be observed that a user is tagging the mobile terminal 100 to a tag terminal 200. Each of the tag terminal 200 and the mobile terminal 100 can transmit and/or receive data by a wireless communication. To this end, the controller 180 can receive data for the setting of the indicator from the short range communication module 114. And, the controller 180 can set up the indicator using the data received from the tag terminal 200. Moreover, the controller 180 can provide a display 300, which indicates that the indicator is set up, as shown in the right part of the drawing, on the display unit 151 using a shop name.

Meanwhile, according to the example shown in FIG. 2, assume that the tag terminal 200 includes a terminal installed at a coffee shop. The tag terminal 200 can send a shop name of the coffee shop, a name of a branch, a geographic information on a branch location, and the like to the mobile terminal 100. In this case, the controller 180 sets a name of the indicator using the shop name of the coffee shop.

According to another embodiment of the present specification, it is possible to set the indicator through a user's input.

Figure 3A:
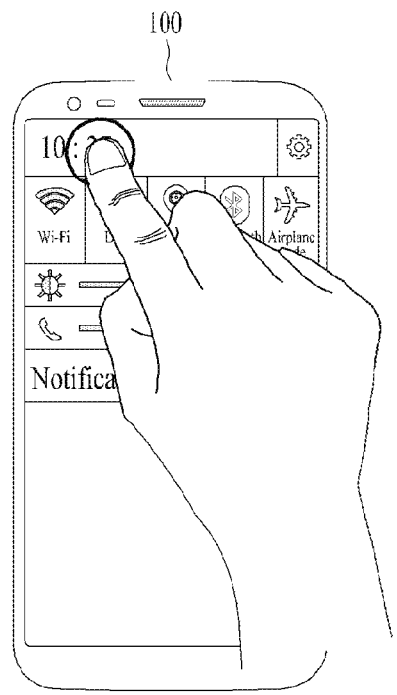
FIG. 3A, FIG. 3B and FIG. 3C are diagrams for one example of setting an indicator through a user's input.
Figure 3B:
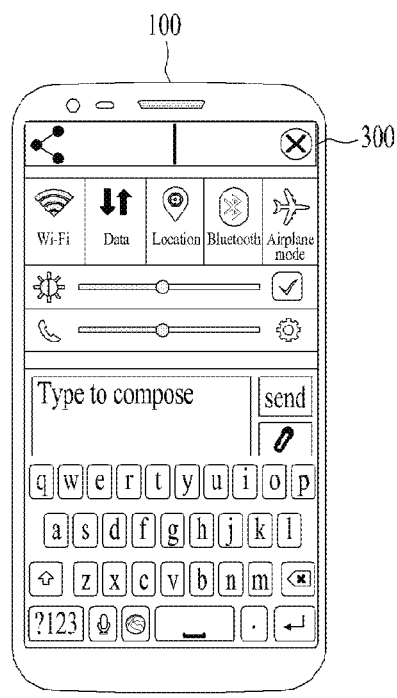

FIGS. 3A and 3B are diagrams for one example of setting an indicator through a user's input.

Figure 3C:
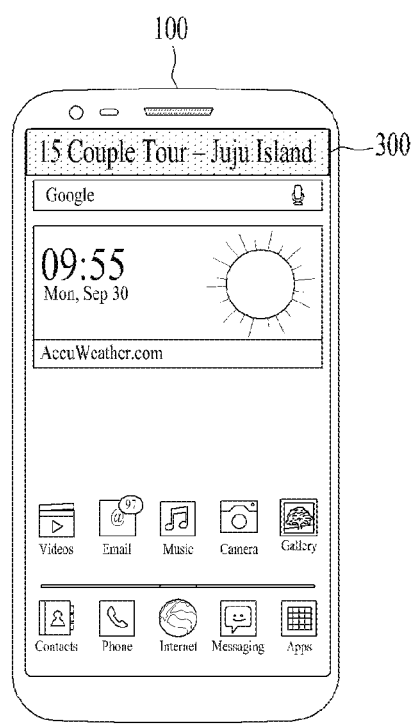

Referring to FIG. 3A, it can be observed that a user touches a top end of the display unit 151. In doing so, referring to FIG. 3B, an interface for setting an indicator can be displayed on the display unit 151. If the user inputs a name of the indicator or the like, the controller 180 can set the indicator using the inputted information. Subsequently, referring to FIG. 3C, using the name inputted by the user, the controller 180 can provide a display 300, which indicates that the indicator has been set, to the display unit 151.

Meanwhile, according to the example shown in FIGS. 3A and 3B, as an input for the user to set the indicator, a touch is applied to the top end of the display unit 151. Such an input method is just one example. And, various user's inputs can be used to set the indicator.

A status display bar, which indicates that the indicator has been set, can be displayed at one of various locations on the display unit.

Figure 4A:
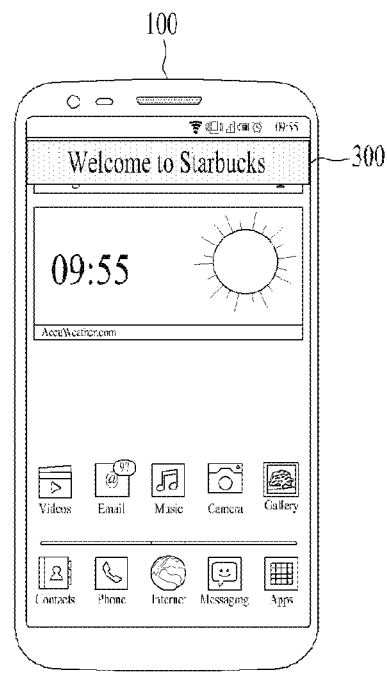
FIG. 4A, FIG. 4B and FIG. 4C are diagrams for one example of displaying a status display bar at one of various locations on a display unit.
Figure 4B:
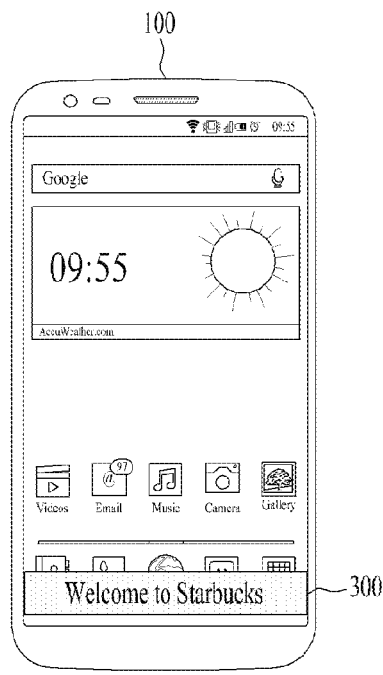
Figure 4C:
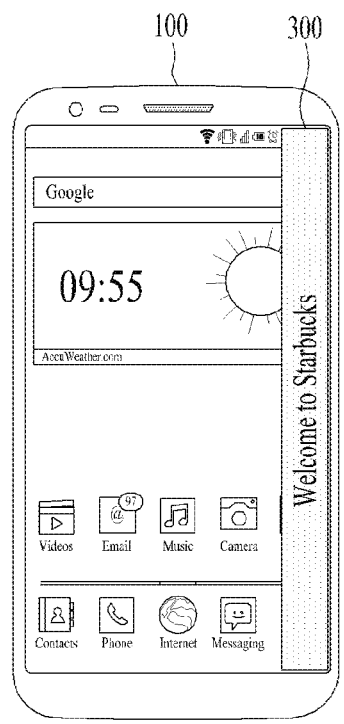

FIGS. 4A, 4B and 4C are diagrams for one example of displaying a status display bar at one of various locations on a display unit.

Referring to FIG. 4A, the status display bar can be located at a top end of the display unit 151 [cf. FIG. 4A], a bottom end of the display unit 151 [cf. FIG. 4B], or a lateral side of the display unit 151 [cf. FIG. 4C]. On the other hand, the display unit 151 may include a bended display having a main region facing a front side of the mobile terminal 100 and a sub-region having a prescribed curvature by extending from the main region. In this case, the status display bar may be displayed on the sub-region.

Meanwhile, the status display bar can be moved by a user's input. According to the example in the present specification, the status display bar has a rectangular shape, by which the shape of the status display bar is non-limited. According to another embodiment, the status display bar can have one of various shapes such as a circular shape, a triangular shape and the like. Moreover, the status display bar can be displayed in at least one of various colors.

The mobile terminal according to the present specification can modify a name of the indicator in response to a user's input.

Figure 5A:
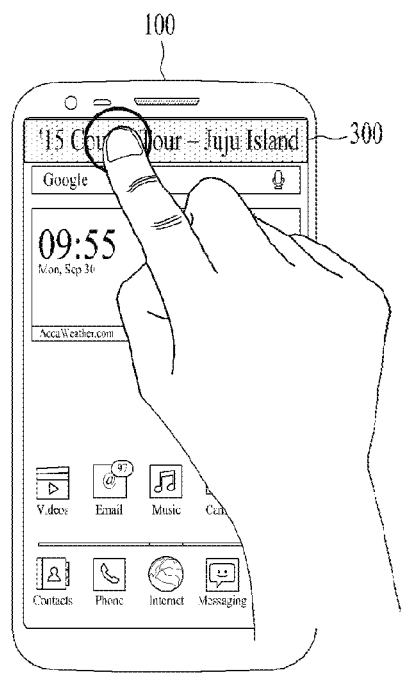
FIG. 5A, FIG. 5B and FIG. 5C are diagrams for one example of modifying a name of an indicator.
Figure 5B:
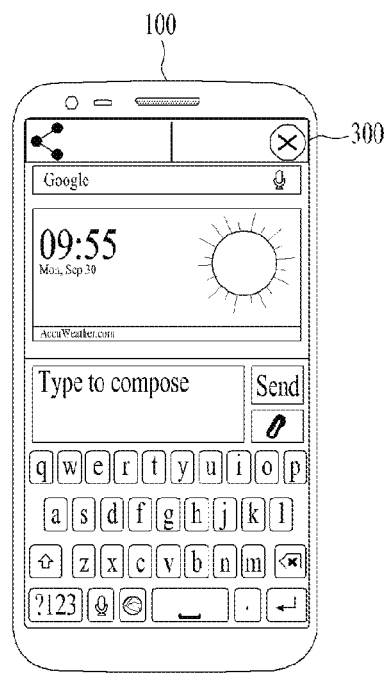
Figure 5C:
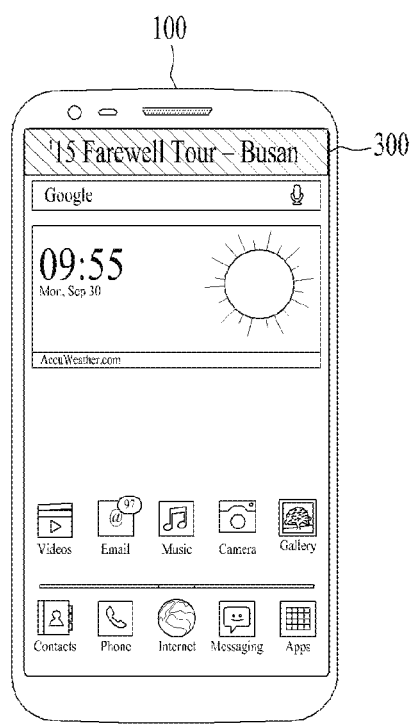

FIGS. 5A-5C are diagrams for one example of modifying a name of an indicator.

Referring to FIG. 5A, it can be observed that a user applies a so-called 'long touch' to a top end of the display unit 151. In this case, the long touch is a user's input for editing the indicator. In doing so, referring to FIG. 5B, a screen for modifying the name is displayed. If the user inputs a name for the modification, referring to FIG. 5C, the controller 180 can display the modified name as the name of the indicator.

Meanwhile, various user inputs can be used to modify the name of the indicator without being limited by the example shown in the drawing.

The mobile terminal according to the present specification can release the setting of the indicator in response to a user's input.

Figure 6A:
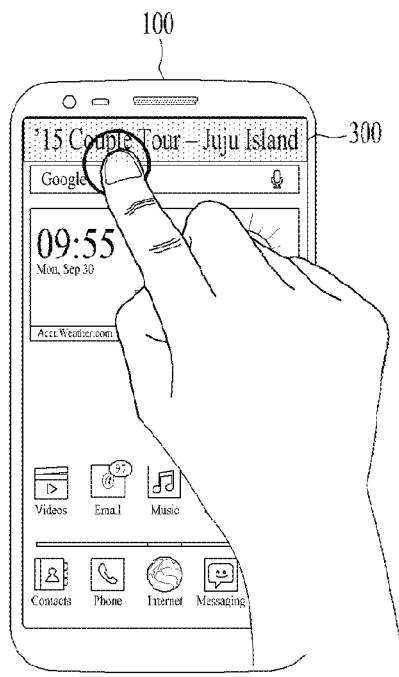
FIG. 6A, FIG. 6B and FIG. 6C are diagrams for one example of releasing a setting of an indicator.
Figure 6B:
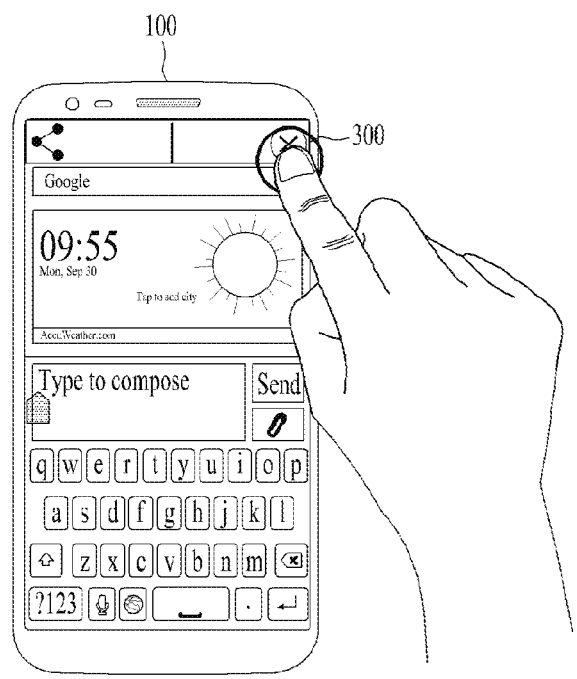
Figure 6C:
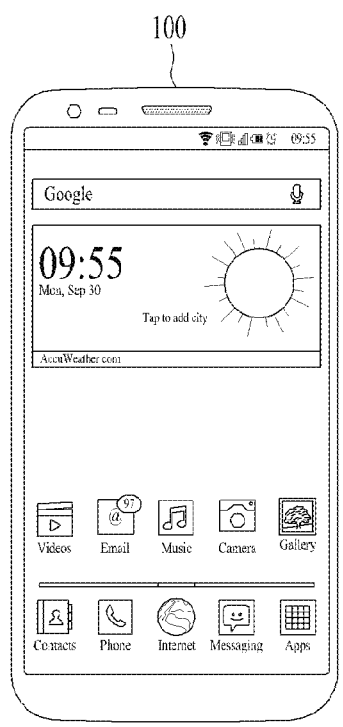

FIGS. 6A-6C are diagrams for one example of releasing a setting of an indicator.

Referring to FIG. 6A, it can be observed that a user applies a so-called 'long touch' to a top end of the display unit 151. In this case, the long touch is a user's input for editing the indicator. In doing so, referring to FIG. 6B, a release button (i.e., a button x) for releasing the setting is displayed on the screen. If the user presses the release button to release the setting of the indicator, referring to FIG. 6C, the controller 180 stops displaying the status display bar of the indicator anymore. Meanwhile, the indicator setting release input method shown in the drawing is just example and various user inputs can be used to release the indicator setting.

Meanwhile, a user may desire to pause the indicator setting rather than to completely release the indicator setting.

Therefore, the mobile terminal according to the present specification can pause the indicator setting in response to a user's input.

Figure 7:
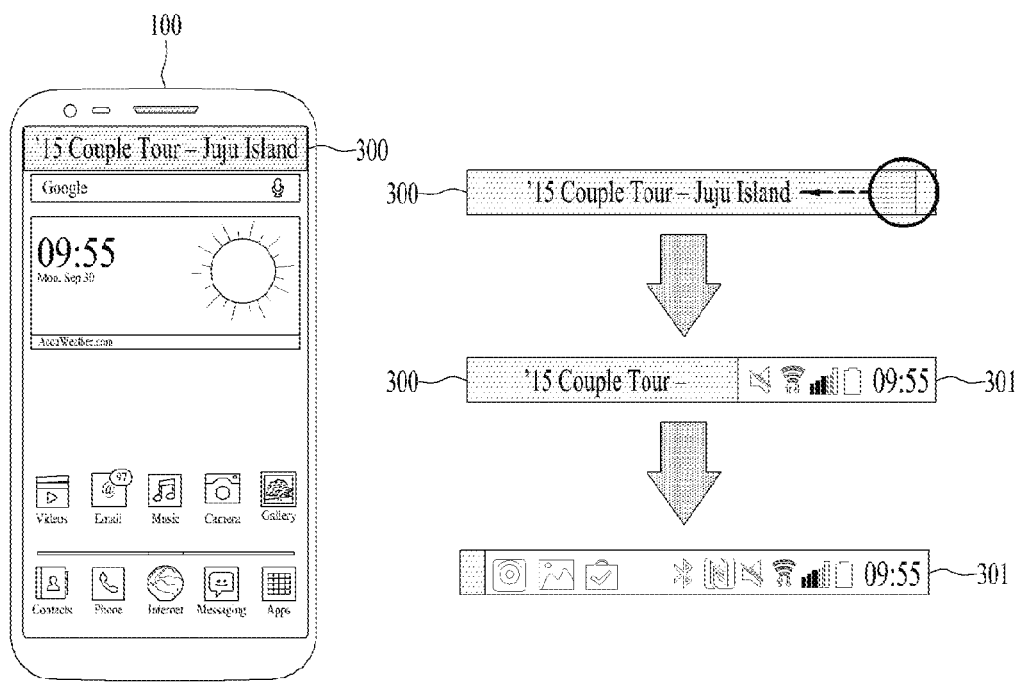
FIG. 7 is a diagram for one example of a pause input for pausing an indicator setting.

FIG. 7 is a diagram for one example of a pause input for pausing an indicator setting.

Referring to FIG. 7, a user may touch and then push a status display bar 300 of the indicator to the left. In doing so, it can be observed that the status display bar 300 of the indicator gradually disappears from the screen due to a status display bar 301 of the mobile terminal appearing from a right side of the screen in response to the user's input. When the controller 180 receives the user's input shown in the example, the controller 180 can pause the indicator setting. The input method shown in the drawing for pausing the indicator setting is just exemplary and various user inputs can be used to pause the indicator setting.

Meanwhile, it should be noted that the above-described user input method is one example only.

The mobile terminal 100 according to the present specification can share the indicator information.

FIGS. 8A-8D are diagrams for one example of sharing indicator information with another mobile terminal.

Figure 8A:
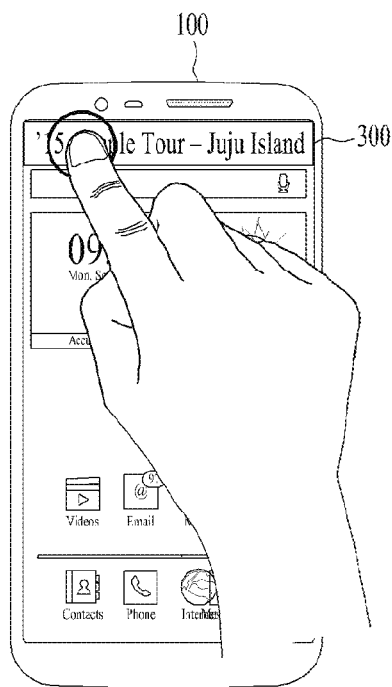
FIG. 8A, FIG. 8B, FIG. 8C and FIG. 8D are diagrams for one example of sharing indicator information with another mobile terminal.
Figure 8B:
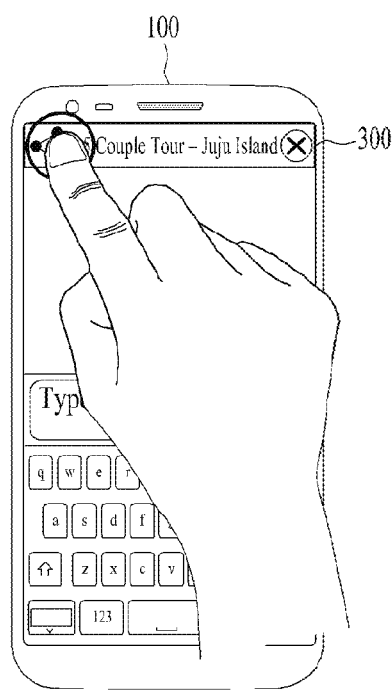
Figure 8C:
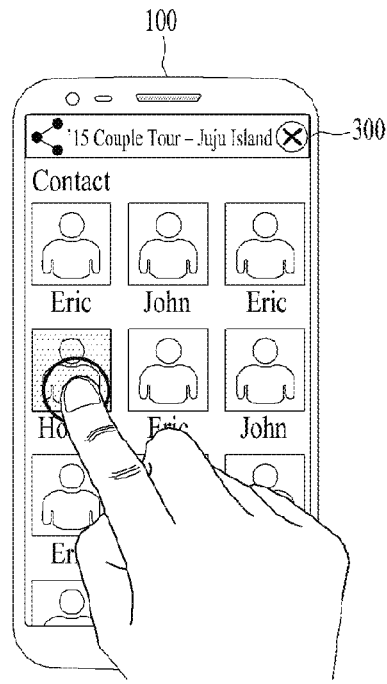
Figure 8D:
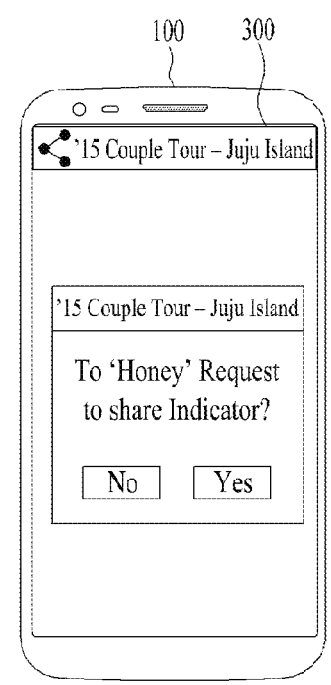

Referring to FIG. 8A, it can be observed that a user applies a so-called 'long touch' to a status display bar 300 of the indicator. In this case, the input of the long touch is a user's input for editing the indicator setting. Referring to FIG. 8B, it can be observed that the user long touches an icon located at a left end portion of the status display bar 300. In this case, the input is a user's input for sharing the indicator information. If so, like the screen shown in FIG. 8C, the controller 180 displays a screen for selecting a user to share the indicator information with. Subsequently, like the screen shown in FIG. 8D, the controller 180 can display a guide screen for checking whether to share the indicator information with the user selected by a user's input. If the user finally inputs an approval, the controller 180 can control the indicator information to be sent to a different mobile terminal. Having received the indicator information, the different mobile terminal can set the same indicator using the received indicator information. Meanwhile, it can be understood that the above-described user's input method is just exemplary.

A user can check a person with whom the indicator is shared.

Figure 9A:
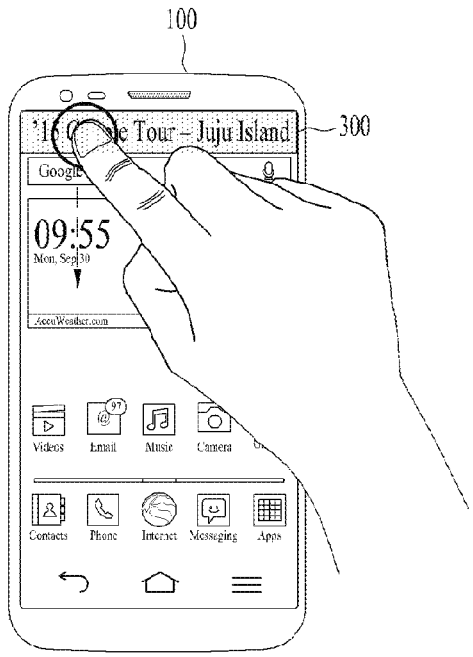
FIG. 9A, FIG. 9B and FIG. 9C are diagrams for one example of displaying an indicator sharer information.
Figure 9B:
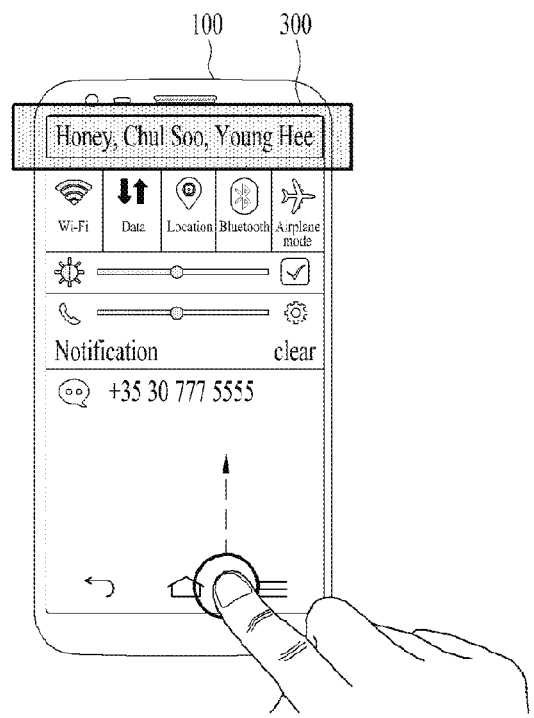
Figure 9C:
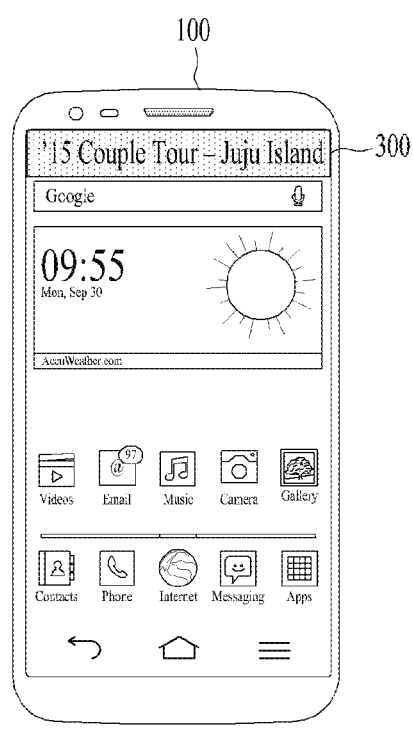

FIGS. 9A-9C are diagrams for one example of displaying an indicator sharer information.

Referring to FIG. 9A, it can be observed that a user inputs a touch input of sweeping the status display bar 300 down. In this case, the touch input is an input for checking a different user with whom the user currently shares the indicator information. When the input is received, referring to FIG. 9B, the controller 180 can display the user with whom the indicator information is currently shared. In particular, the controller 180 can control the different user, with whom the indicator information is currently shared, to be displayed on the display unit in response to a user's input. When the user applies a touch input of sweeping the screen up, referring to FIG. 9C, the controller 180 stops displaying the user with whom the indicator information is currently shared and is able to return to the original screen. Meanwhile, it should be understood that the above-mentioned user's input method is just exemplary.

According to the embodiments described with reference to FIGS. 2 to 9, in case that the indicator is set, the mobile terminal according to the present specification has the information on the user's environment. According to the example shown in FIG. 2, the mobile terminal 100 can recognize the information indicating that the user is currently located at the coffee shop. According to the example shown in FIG. 3, the mobile terminal 100 can recognize the information indicating that the user is on a tour. Moreover, according to the example shown in FIG. 8, the mobile terminal 100 can recognize the information indicating that the user is on a tour with someone. Besides, when the indicator is set, the user can input more specific and detailed additional information [not shown in the drawings]. Furthermore, the tag terminal 200 can provide more specific and detailed additional information to the mobile terminal 100 as well.

When an application is used in the indicator set mobile terminal, how to reflect the indicator information is described in detail as follows.

First of all, various applications can be installed on the mobile terminal 100 according to the present specification. When the controller 180 launches the application installed on the mobile terminal, the controller 180 may use the information of the indicator.

According to one embodiment of the present specification, when the controller 180 sends a message, the controller 180 can add the information of the indicator to the message.

Figure 10:
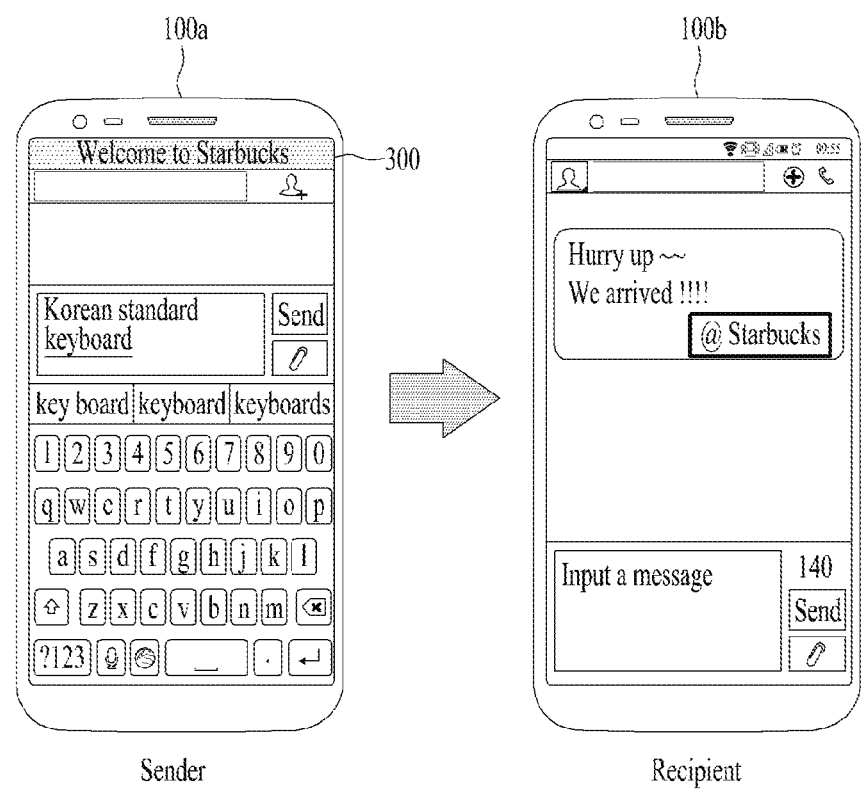
FIG. 10 is a diagram for one example of adding a user's location information to a message.

FIG. 10 is a diagram for one example of adding a user's location information to a message.

Referring to FIG. 10, it can be observed that a mobile terminal 100*a* of a message sender and a mobile terminal of a message recipient 100*b* are shown in the left part and the right part of the drawing, respectively. It can be observed that an indicator is set on the mobile terminal of the message sender 100*a*. And, it can be observed that a user of the sender mobile terminal is currently located at a coffee shop based on a name of the indicator. In this case, if a message is sent, the controller 180 can control information(s) of the indicator to be sent by being added to the message. For instance, the controller 180 can add a user's location information among the informations of the indicator. Having received the message, the mobile terminal 100*b* of the message recipient can display both of the addition of the information of the indicator and the message on the display unit 151. Hence, the user of the receiving terminal can confirm where the sender has sent the message.

Meanwhile, when the mobile terminal according to the present specification receives the indicator information added message, the mobile terminal can launch an app related to the information(s) contained in the indicator.

Figure 11A:
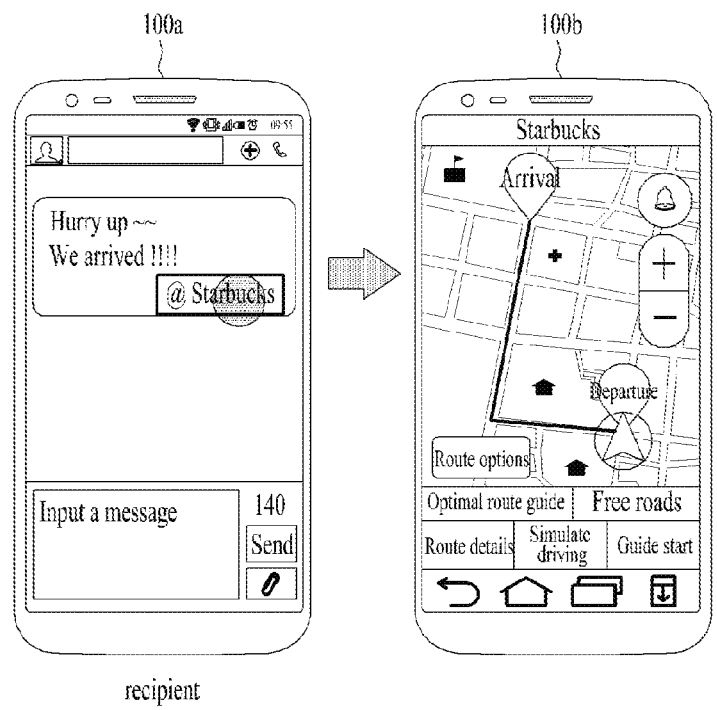
FIG. 11A, FIG. 11B and FIG. 11C are diagrams for one example of guiding to a location of a message sender.
Figure 11B:
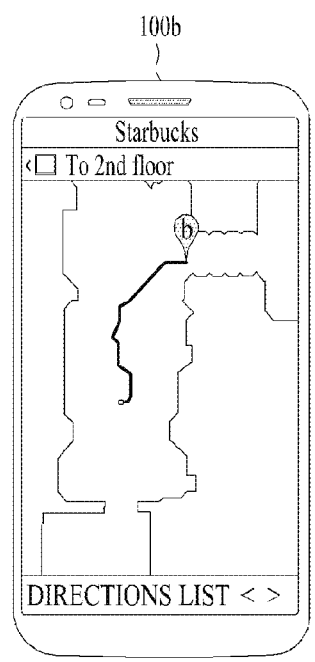
Figure 11C:
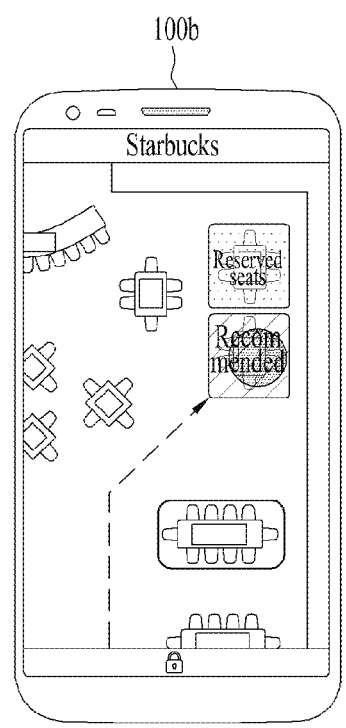

FIGS. 11A-11C are diagrams for one example of guiding to a location of a message sender.

Referring to FIG. 11, it can be observed that a message receiver touches information of an indicator contained in a message. According to the example shown in FIG. 11, the indicator information contains a location information of a message sender. Hence, if the indicator information added to the message is the location information of the message sender, the controller can guide the message recipient to the location of the message sender by launching a navigation application for introducing a route.

In this case, the route introducing application can introduce a route in various ways.

In case that the message recipient is located at an outdoor place, as shown in FIG. 11A, the controller 180 can introduce a route. In case that the message recipient is located at an indoor place, as shown in FIG. 11B, the controller 180 can introduce a route in a manner of displaying an indoor map. When the message recipient enters a coffee shop, referring to FIG. 11C, the controller 180 can introduce a route in a manner of displaying a table location in the shop. According to the examples shown in FIGS. 11A to 11C, a user's location can be changed sequentially depending on a level of proximity to the location of the sender.

According to another embodiment of the present specification, when a phone call is made, the controller 180 can send the information of the indicator in addition.

Figure 12:
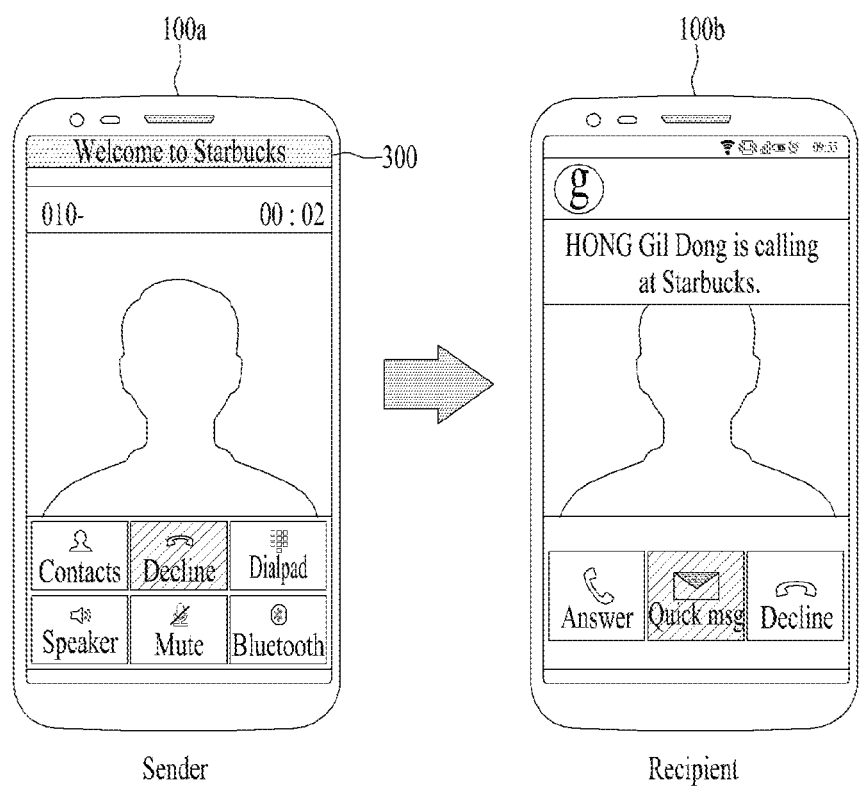
FIG. 12 is a diagram for one example of adding a user's location information in making a phone call.

FIG. 12 is a diagram for one example of adding a user's location information in making a phone call.

Referring to FIG. 12, it can be observed that a mobile terminal 100*a* of a sender and a mobile terminal 100*b* of a recipient are shown in the left part and the right part of the drawing, respectively. It can be observed that an indicator is set on the mobile terminal 100*a* of the sender. And, it can be observed that a user of the sender mobile terminal 100*a* is currently located at a coffee shop based on a name of the indicator. In this case, if a phone call is made, the controller 180 can additionally send control information(s) of the indicator. Having received the message, the mobile terminal 100*b* of the recipient can display both of the addition of the information of the indicator and the sender information on the display unit 151. Hence, the user of the receiving terminal can confirm where the sender makes the phone call.

According to another embodiment of the present specification, while the indicator information is shared with at least one person, when a user uses an application capable of call transmission/reception, the controller 180 can control a contact of the sharer of the indicator information to be preferentially displayed on the display unit.

Figure 13A:
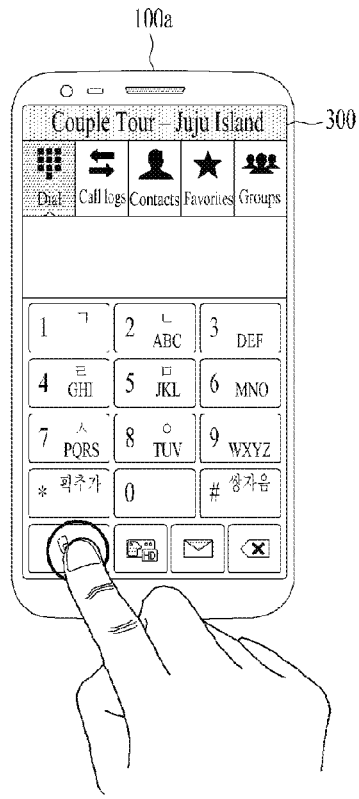
FIG. 13A, FIG. 13B and FIG. 13C are diagrams for one example of using a phone application while indicator information is shared.

FIGS. 13A-13O are diagrams for one example of using a phone application while indicator information is shared.

Figure 13B:
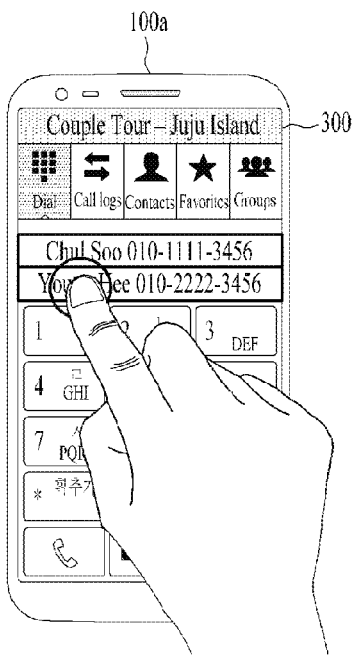
Figure 13C:
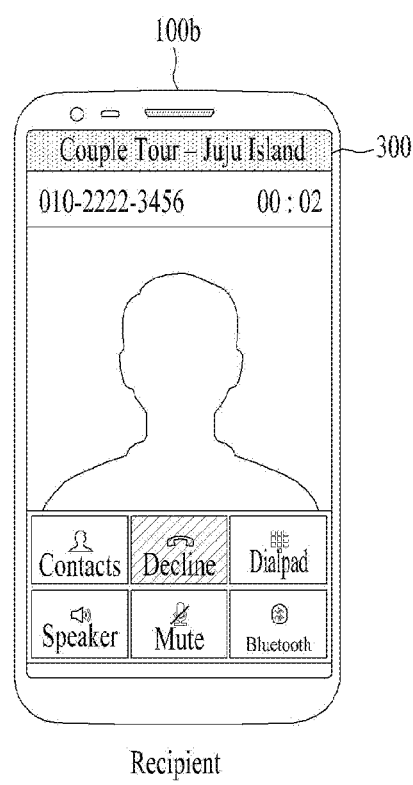

Referring to FIG. 13A, it can be observed that a user currently uses a phone application. In this case, assume that the indicator information is shared with a different user. If the user applies a touch input to a send button, referring to FIG. 13B, at least one contact or more contacts for at least one or more sharers of the indicator information can be preferentially displayed on the display unit 151. If the user touches the contact of one of the displayed sharers, referring to FIG. 13C, an outgoing call can be directly made to the corresponding sharer.

According to another embodiment of the present specification, when an incoming call declining message list is displayed on the display unit 151, the controller 180 may be able to further display a declining message corresponding to a user's environment.

Figure 14:
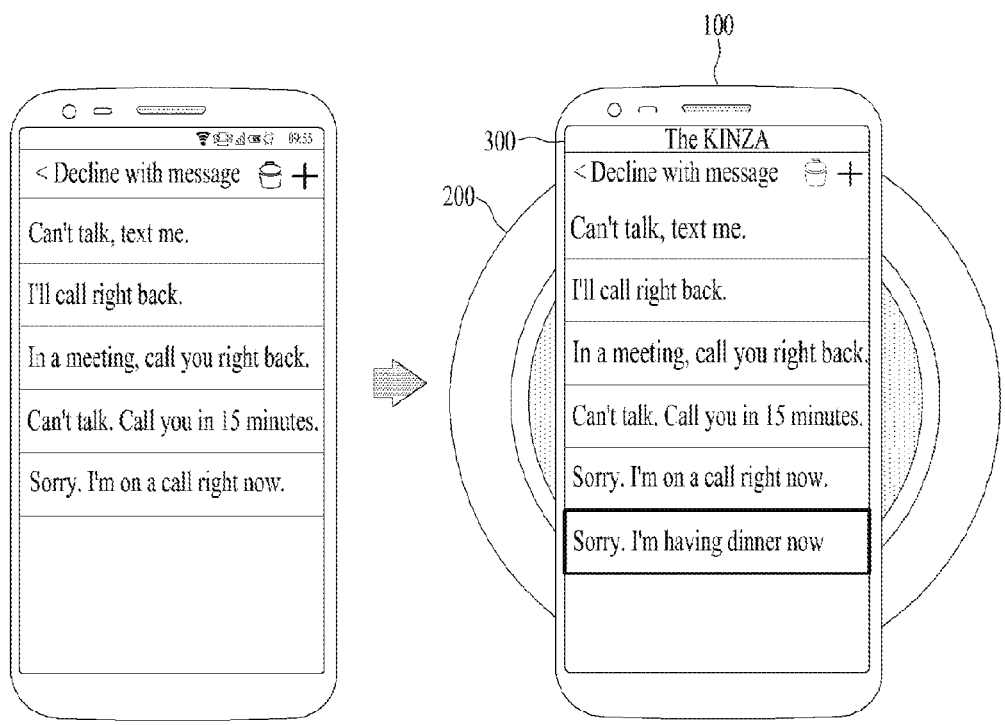
FIG. 14 is a diagram for one example of displaying a declining message corresponding to a user's environment using indicator information.

FIG. 14 is a diagram for one example of displaying a declining message corresponding to a user's environment using indicator information.

Referring to FIG. 14, it can be observed that a message list sent in case of generally declining an incoming call is displayed on the display unit of the mobile terminal shown in the left part of the drawing. Contents of messages contained in the list are previously determined in consideration of several situations but may fail to reflect a user's current environment well. On the other hand, it can be observed that the mobile terminal shown in the right part of the drawing has indicator information set thereon by being tagged to a tag terminal. Hence, the mobile terminal can further display a declining message corresponding to a user's environment using the indicator information. Looking into the bottom part of the display unit of the mobile terminal shown in the right part of the drawing, it can be observed that an incoming call declining message 'Sorry. I'm having dinner now.' Is further displayed. Thus, through the incoming call declining messages capable of describing user's environments in detail, the user can make various selections.

According to another embodiment of the present specification, the controller 180 can add the set indicator information to a captured photo.

Figure 15:
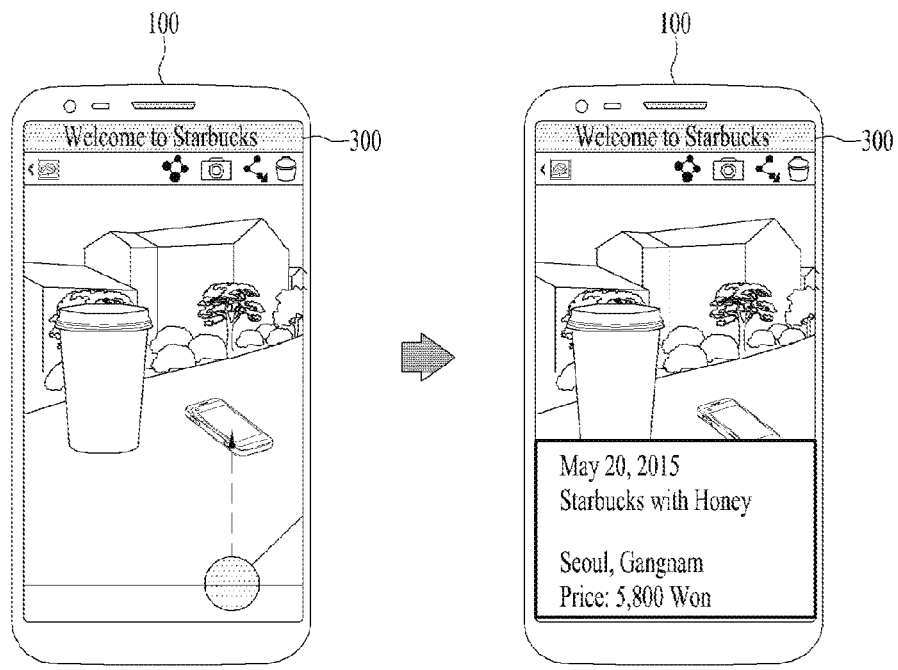
FIG. 15 is a diagram for one example of adding indicator information to a captured photo.

FIG. 15 is a diagram for one example of adding indicator information to a captured photo.

Referring to FIG. 15, it can be observed that a user currently applies an input of sweeping up a bottom part of the display unit on which a captured photo is displayed. In this case, the sweep input may include an input for checking the indicator information added to a photo. When the input is received, the controller 180 can display the indicator information added to the photo on the display unit 151. In this case, the added indicator information may include the information of the indicator set when the photo is taken. As the informations of the set indicator, the controller 180 can add such data as a photo capture time, a photo capture place, a person present at the photo capture, a price of a photo capture product and the like to the photo.

Meanwhile, in case that the photo is uploaded to such a place as an SNS (Social Network Service) or the like, the controller 180 can upload the information of the indicator together.

Figure 16:
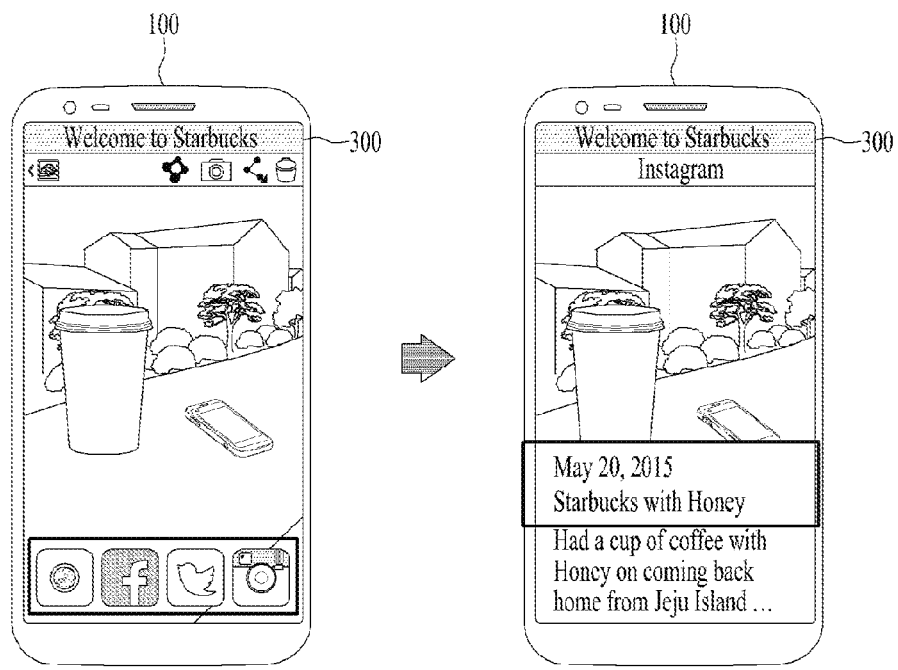
FIG. 16 is a diagram for one example of uploading a photo to SNS (Social Network Service)

FIG. 16 is a diagram for one example of uploading a photo to SNS.

Referring to FIG. 16, when a captured photo is uploaded to an SNS, the controller 180 can upload the indicator information together with the shot photo.

When an indicator is set using a tag terminal, the mobile terminal according to the present invention can transceive data with the tag terminal well as the indicator information.

Figure 17:
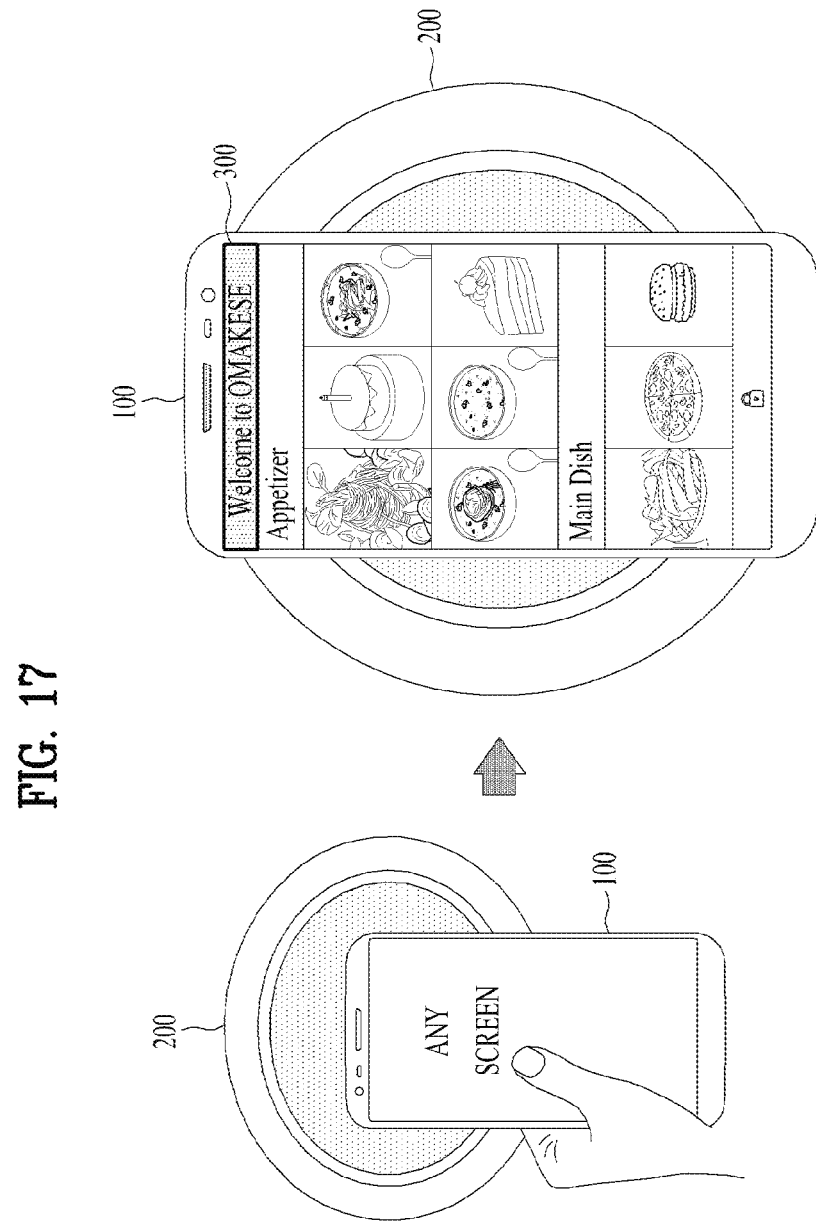
FIG. 17 is a diagram for one example of displaying data received from a tag terminal as well as indicator information.

FIG. 17 is a diagram for one example of displaying data received from a tag terminal as well as indicator information.

Referring to FIG. 17, after the mobile terminal 100 has been tagged to a tag terminal 200, it can be observed that the indicator is set. In this case, the tag terminal 200 shall be assumed as a tag terminal 200 installed at a restaurant. The tag terminal 200 may be able to further transmit data related to the restaurant to the mobile terminal 100 as well as data required for the indicator setting. According to the example shown in FIG. 17, data of a restaurant menu is further transmitted. Hence, the controller 180 can control the menu information, which is received from the tag terminal 200, to be displayed on the display unit 151.

Figure 18:
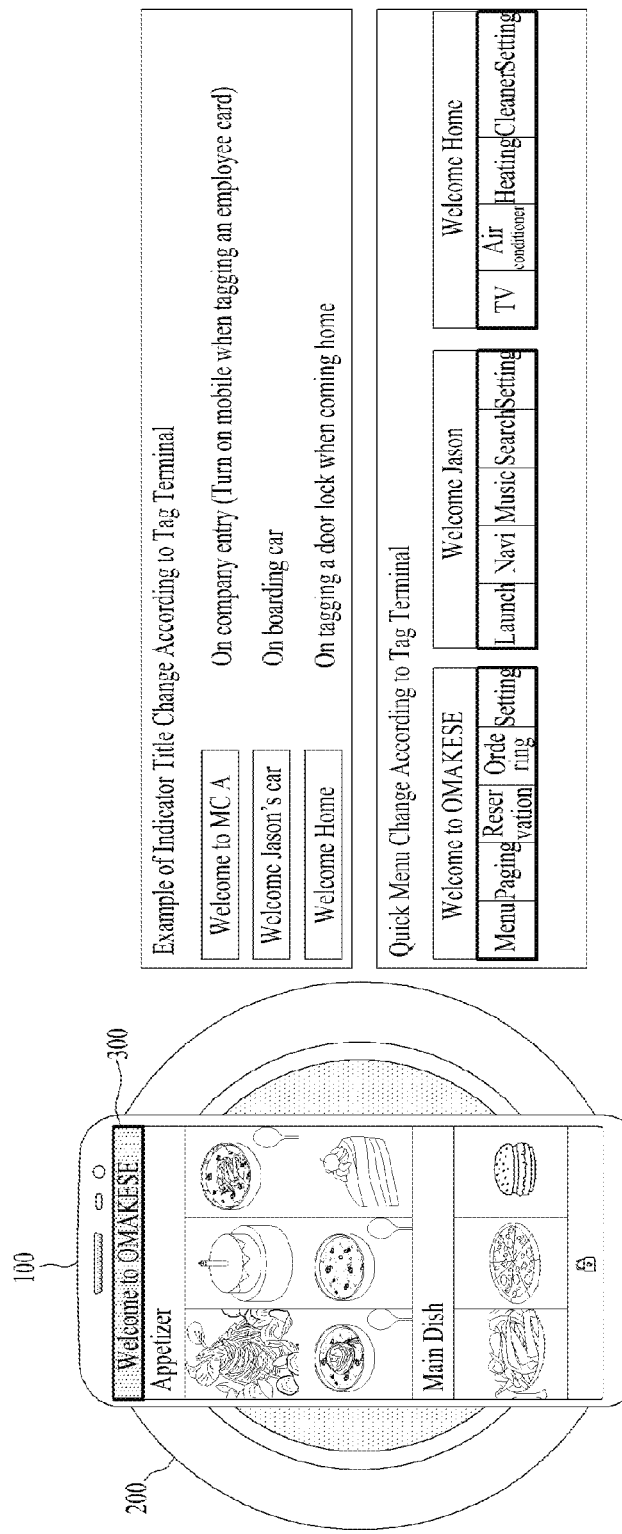
FIG. 18 is a diagram for one example of a screen in accordance with property of a tag terminal installed place.

FIG. 18 is a diagram for one example of a screen in accordance with property of a tag terminal installed place.

Referring to FIG. 18, assume that tag terminal installed places are assumed as 3 kinds of places such as a company, a car and a home. When data is received from the tag terminal, the controller 180 can control a status display bar, which indicates the completion of the indicator setting, to be displayed in a color differing in accordance with a corresponding one of the tag terminals. And, the provided data may differ in accordance with each of the tag terminal installed places. In doing so, using the data received from the tag terminal, the controller 180 can control a menu, which is appropriate for the corresponding tag terminal installed place, to be displayed on the display unit.

Figure 19A:
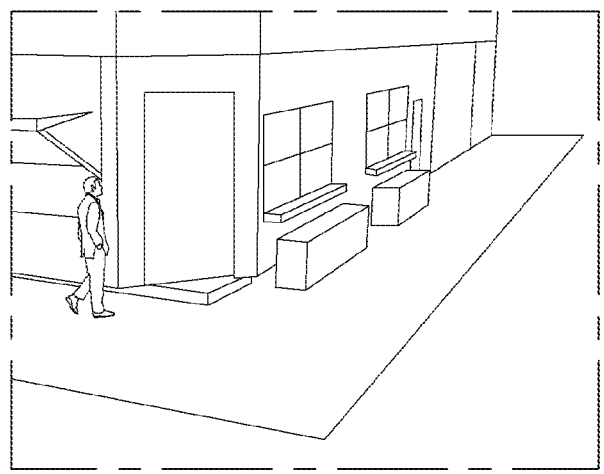
Figure 19B:
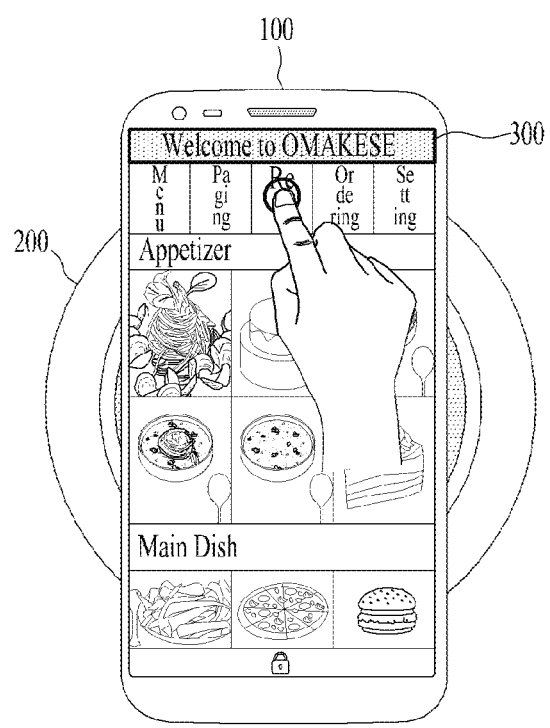

FIGS. 19A-19C are diagrams for one example of a restaurant seat disposition using a tag terminal installed at a restaurant.

Referring to FIG. 19A, it can be observed that a user is located at an entrance of a restaurant. Referring to FIG. 19B, the controller 180 tags the mobile terminal to a tag terminal installed at the entrance, receives data on the restaurant as well as data required for an indicator setting, and then controls the received data to be displayed on the display unit. Referring to FIG. 19C, the controller 180 receives data on a seat disposition from the tag terminal [cf. a reference diagram shown in the lower part of FIG. 19C] and is then able to control a restaurant seat disposition layout and currently available seats to be displayed on the display unit.

FIGS. 20A-20D are diagrams for one example of ordering food using a tag terminal installed at a restaurant.

Figure 20A:
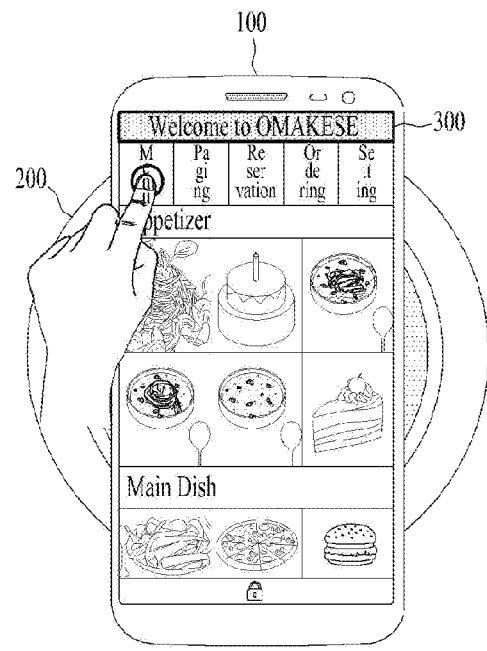
FIG. 20A, FIG. 20B, FIG. 20C and FIG. 20D are diagrams for one example of ordering food using a tag terminal installed at a restaurant.
Figure 20B:
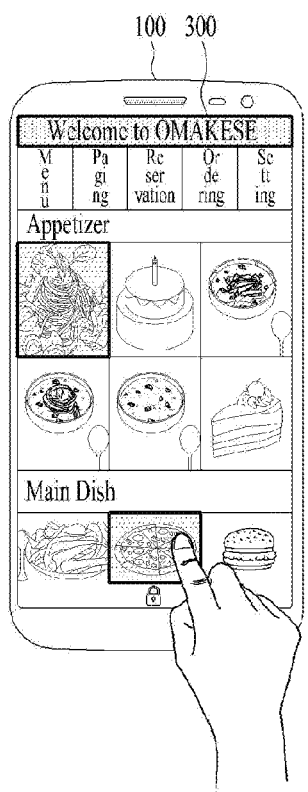
Figure 20C:
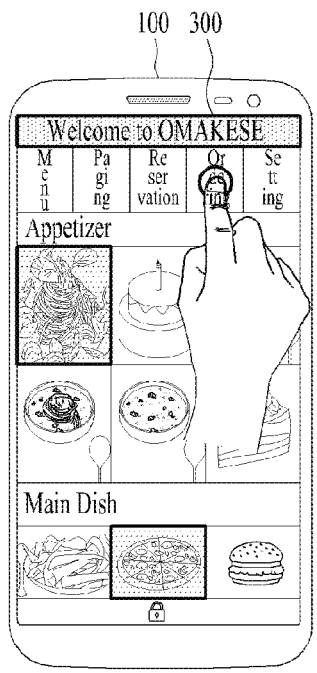
Figure 20D:
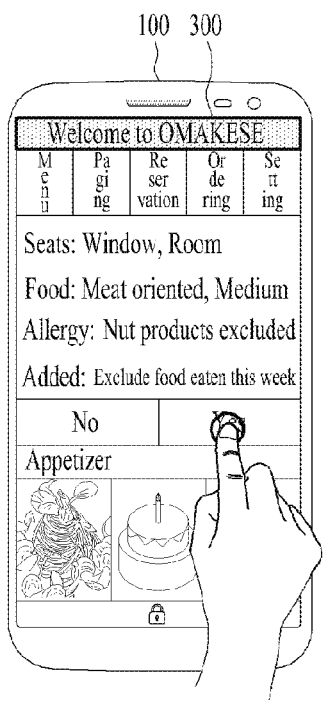

Referring to FIG. 20A, a user receives data on a restaurant menu through a tag terminal installed at a restaurant. Subsequently, the user applies a touch input to a food menu button for a food order. Referring to FIG. 20B, the user can input food to order. If the user applies a touch input to an order button [FIG. 20C], the ordered food is displayed and a screen for requesting a user's approval can be displayed [FIG. 20D]. If the user touches a confirmation button to confirm the ordered contents, the controller 180 sends the information on the items selected from the menu to the tag terminal.

Figure 21:
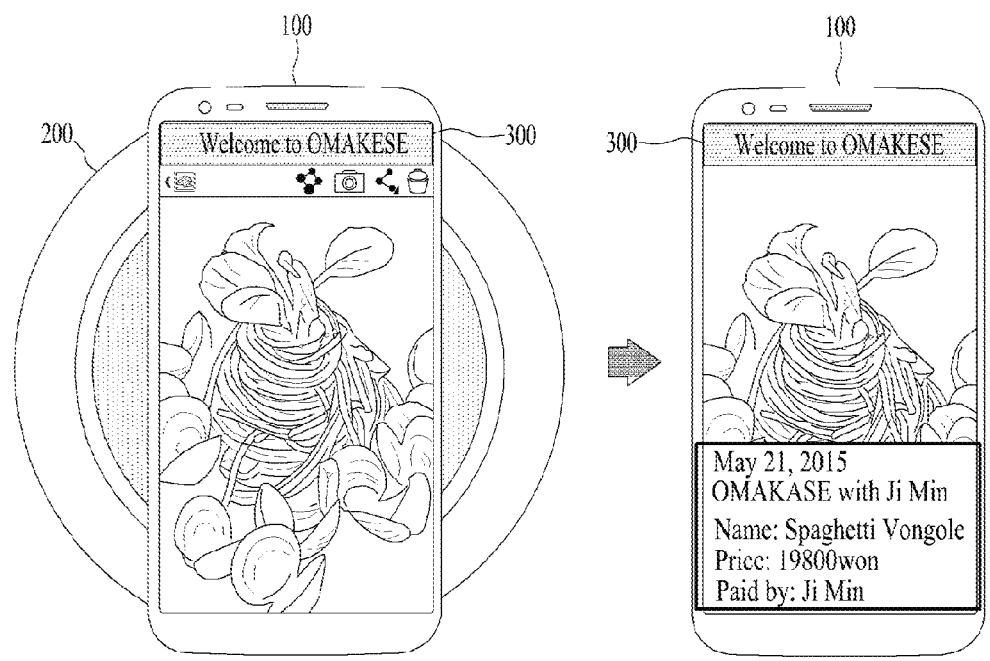
FIG. 21 is a diagram for one example of adding information related to a food photo taken at a restaurant to the photo.

FIG. 21 is a diagram for one example of adding information related to a food photo taken at a restaurant to the photo.

Referring to FIG. 21, it can be observed that the embodiment shown in FIG. 21 is similar to the former embodiment described with reference to FIG. 15. The embodiment shown in FIG. 21 differs from the former embodiment shown in FIG. 15 in that the mobile terminal is tagged to the tag terminal after taking the photo. The tag terminal can transmit data on the contents of the food ordered by a user. Hence, using the data received from the tag terminal, the controller 180 can control details related to the photographed food to be added to the photo. Meanwhile, in case that at least two meals are ordered, the controller 180 analyzes the photographed food by various analysis methods such as a comparison between a shot photo of the food and a reference image, a comparison between the shot photo of the food and a web image and the like and is then able to select data corresponding to the photographed food from the ordered meals. Moreover, the information added to the photo may further include information on a payment amount, information of a payer and the like.

The above-described present invention can be implemented in a program recorded medium as computer-readable codes. The computer-readable media may include all kinds of recording devices in which data readable by a computer system are stored. The computer-readable media may include HDD (hard disk drive), SSD (solid state disk), SDD (silicon disk drive), ROM, RAM, CD-ROM, magnetic tapes, floppy discs, optical data storage devices, and the like for example and also include carrier-wave type implementations (e.g., transmission via Internet). Further, the computer may include the controller 180 of the terminal. It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a display unit configured to display information;
a communication module configured to transceive data; and
a controller configured to:
control the communication module to receive the data from a tag terminal when the mobile terminal is tagged to the tag terminal, wherein the data is related to a location where the tag terminal is installed;
set an indicator of a user environment using the received data; and
control the display unit to display information related to the set indicator and a list including message content for transmitting a message to another mobile terminal;
wherein the message content comprises a first message content and a second message content, wherein the first message content is generated based on the received data related to the location where the tag terminal is installed and the second message content is previously determined, and
wherein the controller is further configured to distinctively display the first message content to be distinguished from the second message content.

2. The mobile terminal of claim 1, further comprising a user input module, wherein the controller is further configured to:
receive a user selection of the displayed information via the user input module; and
control the communication module to transmit the received user selection to the tag terminal.

3. The mobile terminal of claim 1, further comprising a photo capture module, wherein the controller is further configured to:
receive a photo captured via the photo capture module; and
control the display unit to display the captured photo with information related to the received data added to the photo.

4. The mobile terminal of claim 1, further comprising a user input module, wherein the controller is further configured to:
receive a user input via the user input module; and
at least set the indicator or modify a name of the set indicator in response to the received user input.

5. The mobile terminal of claim 1, wherein the controller is further configured to:
control the communication module to transmit the information related to the set indicator to the another mobile terminal.

6. The mobile terminal of claim 5, wherein the information related to the set indicator is included in the message transmitted to the another mobile terminal.

7. The mobile terminal of claim 6, wherein the controller is further configured to add information related to a location of a user of the mobile terminal to the information related to the set indicator.

8. The mobile terminal of claim 6, wherein the controller is further configured to:
receive a message from the another mobile terminal via the communication module, the message including indicator information; and
control the display unit to display the received message with the indicator information.

9. The mobile terminal of claim 8, wherein the controller is further configured to execute a navigation application to guide a user of the mobile terminal to a location of a user of the another mobile terminal when the indicator information comprises location information of the user of the another mobile terminal.

10. The mobile terminal of claim 5, further comprising a user input module, wherein the controller is further configured to:
receive a user input via the user input module; and
control the display unit in response to the user input to indicate a different user currently sharing the information related to the set indicator.

11. The mobile terminal of claim 5, wherein, the controller is further configured to:
execute an application to initiate a phone call to the another mobile terminal; and
control the communication module to transmit the information related to the set indicator to the another mobile terminal when the phone call is initiated.

12. The mobile terminal of claim 5, wherein the controller is further configured to:
execute an application to receive a phone call from the another mobile terminal;
receive indicator information from the another mobile terminal when the phone call is received; and
control the display unit to display the received indicator information.

13. The mobile terminal of claim 5, wherein the controller further configured to:
execute an application to receive a phone call from the another mobile terminal; and
control the display unit to display a decline message list based on the information related to the set indicator when the phone call is received.

14. The mobile terminal of claim 1, further comprising a photo capture module, wherein the controller is further configured to:
receive a photo captured via the photo capture module; and
control the display unit to display the captured photo with the information related to the set indicator added to the photo.

15. A method for controlling a mobile terminal, the method comprising:
receiving data from a tag terminal when the mobile terminal is tagged to the tag terminal, wherein the data is related to a location where the tag terminal is installed;
setting an indicator of a user environment using the received data; and displaying information related to the set indicator and a list including message content for transmitting a message to another mobile terminal, wherein the message content comprises a first message content and a second message content, wherein the first message content is generated based on the received data related to the location where the tag terminal is installed and the second message content is previously determined, and wherein the first message content is distinctively displayed to be distinguished from the second message content.

16. The method of claim 15, further comprising:

receiving a user input; and at least setting the indicator or modifying a name of the set indicator in response to the received user input.

17. The method of claim 15, wherein the information related to the set indicator is included in the message transmitted to the another mobile terminal.

18. The method of claim 15, wherein the indicator is set by using the received data.

\* \* \* \* \*